US010759648B2

(12) United States Patent
Pfennig

(10) Patent No.: US 10,759,648 B2
(45) Date of Patent: Sep. 1, 2020

(54) CLEANING LIQUID DOSING SYSTEM UTILIZING A WEIGHTED HOLLOW PISTON TO DEFINE A DOSING VOLUME

(71) Applicant: PFENNIG REINIGUNGSTECHNIK GMBH, Durach (DE)

(72) Inventor: Dietmar Pfennig, Sulzberg (DE)

(73) Assignee: PFENNIG REINIGUNGSTECHNIK GMBH, Durach (DE)

( * ) Notice: Subject to any disclaimer, the term of this patent is extended or adjusted under 35 U.S.C. 154(b) by 0 days.

(21) Appl. No.: 16/266,900

(22) Filed: Feb. 4, 2019

(65) Prior Publication Data

US 2020/0247664 A1  Aug. 6, 2020

(51) Int. Cl.
| | | |
|---|---|---|
| *B67D 3/00* | (2006.01) | |
| *A47L 13/50* | (2006.01) | |
| *G01F 11/32* | (2006.01) | |
| *F16K 31/524* | (2006.01) | |

(52) U.S. Cl.
CPC ............ *B67D 3/0045* (2013.01); *A47L 13/50* (2013.01); *G01F 11/32* (2013.01); *F16K 31/52408* (2013.01)

(58) Field of Classification Search
CPC ....... B67D 3/0045; A47L 13/50; G01F 11/32; G01F 11/30; G01F 11/14; G01F 11/16; G01F 11/18; G01F 3/24; F16K 31/52408
USPC .......... 222/425, 448, 453, 26, 430, 434, 250
See application file for complete search history.

(56) References Cited

U.S. PATENT DOCUMENTS

| | | | | |
|---|---|---|---|---|
| 2,282,110 | A * | 5/1942 | Angell ................... | G01F 11/16 222/308 |
| 2,537,415 | A * | 1/1951 | Noel ....................... | G01F 11/18 222/340 |
| 2,864,538 | A * | 12/1958 | Rasmussen ............. | G01F 11/16 222/453 |
| 3,029,002 | A * | 4/1962 | Gregoire ................ | A47G 19/34 222/307 |
| 4,394,941 | A * | 7/1983 | Recine ................... | A47G 19/34 222/355 |
| 5,421,491 | A * | 6/1995 | Tuvim ................... | A47J 31/404 222/336 |
| 5,855,300 | A * | 1/1999 | Malki .................... | A47G 19/34 222/153.09 |
| 6,450,371 | B1 * | 9/2002 | Sherman ................. | G01F 11/18 222/336 |
| 6,962,274 | B1 * | 11/2005 | Sherman ................. | G01F 11/18 222/344 |
| 8,439,231 | B2 * | 5/2013 | Schroedter ............... | B65B 1/36 222/153.13 |
| 2004/0031819 | A1 * | 2/2004 | Smiley ................... | G01F 11/18 222/449 |
| 2006/0255074 | A1 * | 11/2006 | Amir ...................... | G01F 11/18 222/361 |

(Continued)

FOREIGN PATENT DOCUMENTS

| | | |
|---|---|---|
| DE | 10211978 A1 | 9/2002 |
| DE | 202013011946 U1 | 12/2014 |

(Continued)

*Primary Examiner* — Benjamin R Shaw
(74) *Attorney, Agent, or Firm* — Notaro, Michalos & Zaccaria P.C.

(57) ABSTRACT

A dosing system for cleaning liquids in the field of commercial cleaning having a storage volume and a dosing device arranged on the storage volume as well as a corresponding dosing method.

8 Claims, 11 Drawing Sheets

(56) References Cited

U.S. PATENT DOCUMENTS

Figure 1:
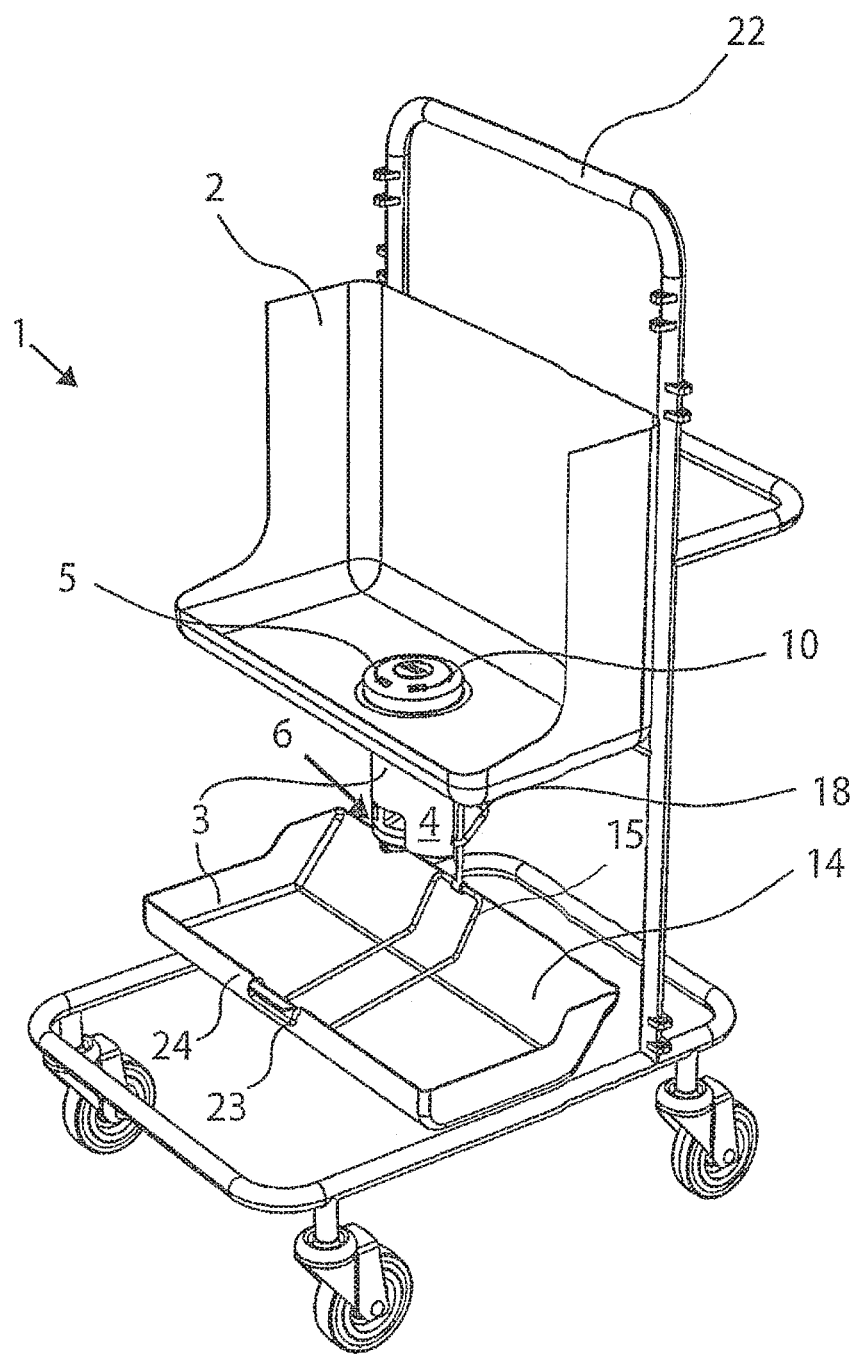

| | | | | |
|---|---|---|---|---|
| 2015/0041491 A1* | 2/2015 | Muller | ............... | A61J 1/03 222/361 |
| 2016/0015237 A1* | 1/2016 | Zorzo | ............... | A47L 13/50 251/318 |
| 2018/0057248 A1* | 3/2018 | Jinks | ............... | G01F 11/14 |

FOREIGN PATENT DOCUMENTS

| | | | |
|---|---|---|---|
| EP | 0781524 | A2 | 7/1997 |
| EP | 1262139 | A2 | 12/2002 |
| EP | 0858766 | B1 | 5/2003 |
| EP | 1736091 | A1 | 12/2006 |

\* cited by examiner

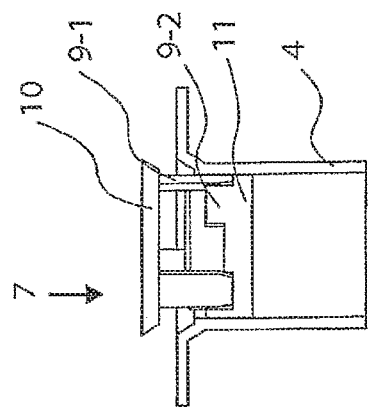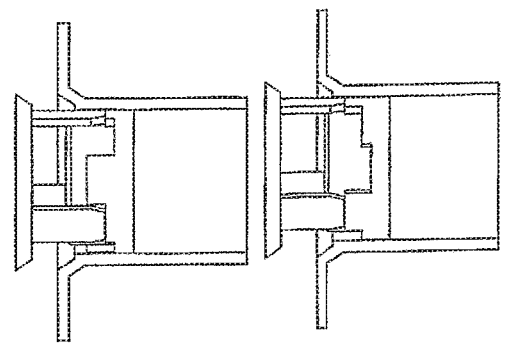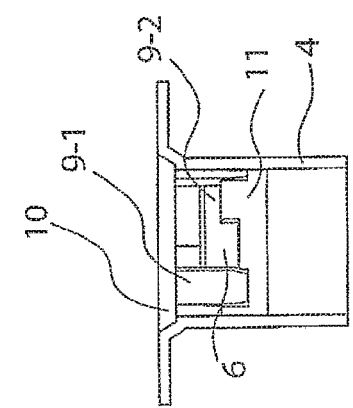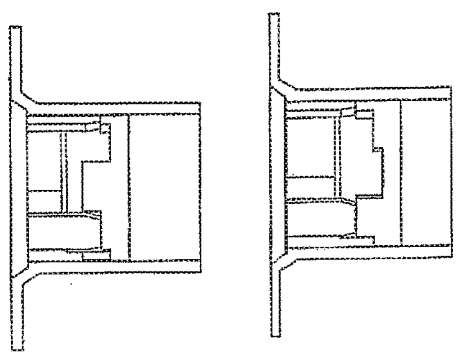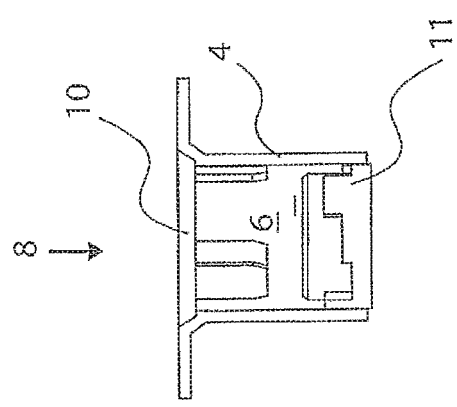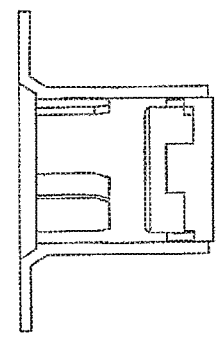

CLEANING LIQUID DOSING SYSTEM UTILIZING A WEIGHTED HOLLOW PISTON TO DEFINE A DOSING VOLUME

The present invention relates to a dosing system in the field of commercial cleaning for the dosing of cleaning solution on mop covers as well as to a dosing method for the dosing of cleaning solution.

Mop covers of different materials, for example of microfiber or comprising a microfiber content, are used in the field of commercial cleaning, depending on area of use. Such a mop cover is thereby carried along on a cleaning trolley, so as to either already pre-wetted or is wetted directly on site. In the first case, containers are used, in which the stacked, fresh mop covers are stored so as to be wetted with a certain amount of cleaning solution, and which are typically stored upside down on the cleaning trolley for a while shortly prior to removal of a mop cover, in order to ensure their even moisture penetration. Such containers are described, for example, in EP 0 858 766 B1. According to EP 1 262 139 A2, these containers can also have a cleaning agent reservoir, which releases cleaning solution to the stored fresh mop covers as a function of the strain state. The term cleaning solution is thereby used globally for all solutions, which are used during a commercial cleaning and in particular also captures disinfecting solutions.

In the case of the method for wetting on site, the mop cover was traditionally dipped into an open container comprising cleaning solution and was subsequently dewatered slightly by means of pressing. This method, however, leads to inaccurate and non-consistent amounts of cleaning agent on the mop covers. Such consistency, however, is of great importance, because mop covers, which are too wet, slide on a water film, so to speak, and thus do not sufficiently absorb the dirt particles. Moreover, an excess of cleaning solution usually has a disadvantageous effect on the surface to be cleaned. Mop covers, which are too dry, in turn, also have an impeded dirt particle absorption, because, in the case of a mop cover, which is too dry, the latter are not sufficiently washed in the fibers thereof. The strain on the fibers of the mop cover in response to mopping is also higher, so that said fibers fray more easily and release particles in an undesirable manner, which is undesirable in particular in response to a cleaning in a clinical or other clean room.

Storage containers for cleaning agents, which release a certain amount of cleaning solution from a reservoir, have thus also been developed.

Such a device is described in EP 0 781 524 A2. Here, a user uses his mop holder with mounted mop cover to press on a pressure plate from the top, which raises a valve via a lever system, so that cleaning solution can flow from a storage tank through the released line to the mop cover from below. Cleaning solution flows as long as the user pushes on the pressure plate, so that an exact dosing is difficult.

A device, in the case of which a closed storage container is arranged on a cleaning trolley above a collection container and releases a certain amount of cleaning agent, which can be set within certain limits, after a manual operation, is known from EP 1 736 091 A1. This release takes place via two valves, which can be moved via lever against spring forces and which each regulate inflow and outflow into a metering chamber. In particular the not very practical, complex setup and, associated therewith, an inadequate cleanability, are disadvantages of this known device.

Finally, metering devices are also known, in the case of which a scooping device is arranged in a storage container below a cleaning solution surface and which is lifted out beyond said surface via a pivoting or lifting movement, so that a certain volume of cleaning solution is made available for wetting a mop cover by means of immersion. The movement of the scooping volume, which, in particular in response to pure lifting movements as in the case of DE 20 2013 011 946 U1, lead to splashing and thus to a very unclean work, is disadvantageous here.

A liquid dispenser for removing foam is known from DE 102 11 978 A1, in the case of which a pump piston slides in a cylindrical hollow space, the upper end of which communicates with a storage volume. The pump piston can be moved vertically between a first and a second position by means of a lever, which is acted upon by force, wherein the piston rod is embodied as hollow pipe comprising wall openings, and it has disks, which point radially outwards and are spaced apart from one another along the piston rod longitudinal axis. Two of these disks define a dosing volume between one another, closed by the wall of the cylindrical hollow space, in which the pump piston slides, which, in one position, communicates with the storage volume and, in a second position, dewaters a cylindrical hollow space of a larger diameter, in which the liquid can reach via the wall openings into the interior of the hollow pipe and from there via the lower end thereof to the outside to a user. This device is structurally complex and is not suitable for a quick wetting of a mop cover.

A valve body of a dosing unit in the field of commercial cleaning is known from US 2016/0015237 A1, in the case of which a storage volume is arranged above the dosing device. Said dosing device has a conical pipe section, which communicates with the storage volume, and a piston, which is movably guided in this section and which moves a valve plate arranged on its axial upper area, which valve plate closes or releases the storage volume. In the released position, cleaning liquid flows downwards past the valve plate along the piston and exits there. This known device is structurally complex.

The present invention thus has the object of specifying a dosing device, which is structurally simple and which provides for safe, clean work.

This object is solved by means of a dosing system for cleaning liquids in the field of commercial cleaning, having the features of a storage volume and a dosing device, which is arranged on the storage volume, wherein the dosing device has a pipe section, which communicates with the storage volume, and a hollow piston, which is movably guided in said pipe section, wherein a hollow space of the hollow piston, which is in the first position, can be accessed from the storage volume, and the hollow space of the hollow piston, which is in a second position, communicates with a surrounding area of the dosing system, wherein the hollow piston has two front face covers, which are spaced apart from one another by means of a spacer and which define a dosing volume between one another, wherein the spacer is embodied as cylinder jacket section and/or as one or more webs, wherein the webs are connected to one another and/or are divided once or several times in their longitudinal axis and/or are embodied so as to be connected to a front face cover.

The invention thereby understands a hollow piston to predominantly be a piston, which, between an upper and a lower end, has a non-material-filled, intrinsic volume, which can be moved by it. According to the invention, such a piston does not mandatorily have a side wall and especially not a closed side wall, as it would be formed, for example, by a jacket surface of a cylinder, because such side walls with the same functionality can also be formed by that component, in which the hollow piston according to the invention can be moved. Such a hollow piston is structurally simple and highly functional and, with its own volume for receiving a cleaning solution, provides a closed space, which can be accessed for the inlet and outlet of the cleaning solution by movement from a first into a second position. The provision of such a closed volume—the dosing volume—eliminates the risk of an excessive or low dosing of cleaning solution on the mop cover, as known from the prior art, and as it is at hand in the case of outflows, which are opened via valve, from cleaning solution reservoirs by means of pressure plates, which are actuated by the user. Due to the fact that the invention is preferably operable purely mechanically, electrical drives with the corresponding necessity of a voltage supply are advantageously avoided. Due to the fact that the hollow space can only be accessed in a first position from the storage volume, an unwanted running dry of the storage volume is advantageously avoided, because said hollow space is not in contact with the storage volume in every other position. The hollow space communicates with a surrounding area only in the second position, so that the storage volume is closed in this position, at least does not communicate with a surrounding area via the hollow piston. In this second piston, the hollow piston is preferably embodied so as to seal the storage volume.

According to the invention, it is provided that the hollow piston has two front face covers, which are spaced apart from one another by means of a spacer. The front face covers are thereby preferably embodied so as to seal against the pipe section or the storage volume, respectively, the length of the spacer, together with a base area of a cover, then determines the useful volume of the hollow piston. Spacers according to the invention can be made in one piece or multiple pieces, they can be embodied as coaxial rod or as wall or wall section, respectively, between the covers in a manner of a (partial) jacket surface. A spacer according to the invention is also a spacer, which, viewed in the cross section, is embodied to be linear or bent or star-shaped with three or four arms, and thus divides the space between the two front face covers into two, three or four parts, respectively, in order to thus create different partial volumes. The front face covers are thereby preferably embodied to have a circular cross section, but, according to the invention, can also have other cross sectional surfaces, for example in the form of an n-corner or in the form of an, in particular flat, round convex surface.

If a front face cover consists of a high-alloyed steel, in particular a stainless high-grade steel, it can be autoclaved and can hardly be damaged mechanically, at least not with normal, possibly rough handling during the use. One or both covers, which are embodied in this way, simultaneously make the hollow piston according to the invention heavy enough, in order to be gravity driven on their own in the second position, in which its hollow space is embodied so as to be sealed against the storage volume. Advantageously, a retrieval device, such as a spring or like, is thereby superfluous. According to the invention, the hollow piston thus has to be actuated intentionally, in order to be brought into the first position, the filling position. In other words, the second position is embodied as its force-free rest position.

The spacer according to the invention is embodied as cylinder jacket section and/or as one or more webs. As already described, the spacer can be embodied as part of a cylinder jacket, thus can have corresponding openings in its jacket surface. According to the invention, this also captures embodiments, in the case of which the cylinder jacket section is embodied, for example, as webs, which are radially spaced apart from one another, between the two covers, wherein these webs can also be embodied so as to be divided into two parts in their length in different ways. This provides in particular for a manual settability of the hollow space volume, because a rotation of one cover against the other has the result that the distance to one another changes. The webs according to the invention can thereby divide the hollow space into several subvolumes, in particular when they completely permeate the cross sectional surface.

The webs are embodied so as to be connected to one another and/or so as to be divided once or several times in their longitudinal axis and/or so as to be connected to a front face cover. These more specific embodiments provide for a settability of the hollow space volume and will be described in more detail below in the figure description.

If the pipe section is embodied cylindrically and has at least one first wall opening on its end, which faces away from the storage volume, and/or has at least one second wall opening on its end on the storage volume side, it is advantageously attained that the cleaning solution located in the dosing volume does not flow out in surges, but slowly and in a controlled manner, and is thus applied in a clean and almost splash-free manner. The mentioned first and second positions are thereby not necessarily understood as an exact, locally accurately defined position, but in fact especially as functional position, in which a filling of the dosing volume takes place, and, accordingly, an emptying, in particular the described controlled, non-surging emptying, in the second position. The openings are thus designed as through openings in the wall, in particular as with their lower edge being aligned with the dosing volume-side surface of the lower front face cover, so that a complete emptying and transfer of the dosed amount of cleaning agent is made possible.

It is provided in further development of the invention that it has more than one hollow piston, in particular several hollow pistons, which each differ in their dosing volume, preferably due to different spacer volumes. The settability of a dosing volume, which is also attained thereby, is thus made possible easily by means of user-side replacement of a hollow piston by another one. The different hollow pistons, which are then provided according to the invention, are as identical as possible in their outer dimensions, the change of the dosing volume is attained by changing the spacer volume, thus in other words, by means of thicker or thinner spacers, wherein they are preferably embodied as column-like spacers, in particular coaxially to the longitudinal axis of the hollow piston and thus preferably has a circular or circle-like cross sectional surface. It can thus be produced as simple turned, milled or also injection molded part.

In embodiment of the dosing system, it is provided that a front face cover has a compensation weight, in particular a compensation weight, which is arranged in such a way that, in the second position, it rests on a storage volume-side edge of the pipe section. Advantageously, such a compensation weight compensates the different weights of the individual hollow pistons, which differ from one another due to the different spacer volumes. In the filled state, all of the different hollow pistons thereby have the same weight and thus move identically, whereby a user can always perform the same operating routine. The resting of the upper front face cover or the compensation weight thereof, respectively, in the lower, second position of the hollow piston, simultaneously ensures that said hollow piston cannot exit downwards through the cylindrical pipe section and can also always be emptied completely, because a dead volume cannot form as a result of lowering too deeply between lower edge of the wall opening(s) and the top side of the lower front face cover. The hollow pistons according to the invention preferably moved downwards in a gravity-driven manner, regardless of filling state. The mass increase by the filling of the dosing volume supports this movement.

If a collection tray, which is spaced apart from the storage volume, is provided according to the invention, a wetting of a mop cover is made possible in a highly advantageous manner, without cleaning solution, which may drip down, being splashed into the surrounding area, but that said cleaning solution is instead caught cleanly.

In embodiment of the invention, it is provided that an actuating element, which acts on the hollow piston, is provided, in particular a mechanically acting actuating element, preferably one, which acts purely mechanically, wherein the hollow piston has a contact element to the active end thereof. Such an actuating element is embodied to move the hollow piston from one into another position. This one position can thereby be the described first or the described second position, wherein this other position is then the respective remaining described position. In the simplest case, it is provided according to the invention that the actuating element moves the hollow piston from the second, the rest position, into the first position, the filling position, and that said hollow piston is embodied so as to subsequently slide back into the initial position of this movement in a gravity-driven manner. An active movement is only carried out on the part of a user in this case. It goes without saying that it is also in accordance with the invention, when the hollow piston movement is driven completely by the actuating element, thus when said actuating element is embodied so as to move the hollow piston from one into the other position and back. Actuating elements are preferred, which act purely mechanically, for example a shaft, which is guided below a bottom of the storage container and which ends laterally on the storage container in a hand wheel or lever or handle, which can be operated at that location, and which has, for example, a cam in the area of the hollow piston, by means of which a force can be transferred to said hollow piston. It is also preferred that only one piston movement takes place so as to be intentionally driven by a user.

In embodiment of the invention, an actuating element, which acts on the hollow piston, is provided, in particular a mechanically-acting actuating element, preferably one acting purely mechanically, wherein the actuating element is arranged in the collection tray, and has an active end acting on the hollow piston, wherein the collection tray is preferably embodied so as to be spaced apart from an end of the pipe section, which is at a distance from the storage volume, and wherein the actuating element is preferably embodied so as to be articulated on the collection tray, in particular a tilt lever is arranged between actuating element and active end. The actuating lever acts purely mechanically on the hollow piston, in particular by means of an active end arranged thereon, which is, for example, an articulated connection to the hollow piston. The outflowing cleaning agent volume is collected in the collection tray and can be accessed by the mop cover there, so that a splash-free wetting of the mop cover is made possible. A user thus actuates the actuating lever with the mounted mop cover and can receive the cleaning agent after it flows out. The drop height is thereby preferably selected in such a way that a splashing is prevented, if possible, intensified by a corresponding dimensioning of the collection tray and the side wall heights thereof or by the provision of an impact plate or the like. If the actuating element is embodied so as to be articulated on the collection tray, a structurally simple and operationally reliable embodiment of the actuating mechanism of the hollow, has been found. If a tilt lever is arranged between actuating element and active end, an in particular autoclavable power transmitter, which is structurally simple, operationally reliable and can be cleaned easily, has been found. If the remote end of the outlet pipe has an outlet opening in the pipe jacket, it is not only made possible in an advantageous manner that the cleaning agent located in the volume of the hollow piston can flow out over the edge of the lower cover, which is exposed in the second position, but this volume can instead also flow off through the pipe wall, which makes the emptying of the hollow piston quicker and less turbulent, which, in turn, provides for clean and quick work.

Finally, it is also provided that the hollow piston has a contact element to the active end. According to the invention, this contact element is simultaneously also embodied to guide the active end, thus a contact and guide element, which can be embodied as groove, web, track, gate or the like. It is crucial that the hollow piston comprising contact element is not connected or is at best releasably connected to the actuating device, so that the actuating device can be removed from the device independently of the hollow piston.

In embodiment of the dosing system, it is further provided that it is embodied for wall assembly, and/or has a cover and/or a pressure compensation device. Such a wall assembly is always advantageous, when relatively small spaces, such as, for example, in pharmacies, need to be cleaned. Due to these local conditions or the desired cleaning sequences, it is then in accordance with the invention to arrange the storage volume in a stationary manner, for example via wall assembly. In this case, the already described cover is not optional, but mandatorily required, in order to keep the storage volume covered and largely closed off from the surrounding area. A prepared cleaning solution in the storage volume would thus possibly be available for days. In the case of this embodiment, a pressure compensation option is also arranged on the cover and/or storage volume, possibly also comprising air filter, so as not to obstruct the removal of the cleaning liquid, when the storage volume empties slowly. The already described further components of the dosing device are also present in the case of this embodiment, possibly also in wall assembly.

The method object is solved by means of a method for dosing cleaning solution from a storage volume to a cleaning object, in the case of which a hollow piston, which is linearly movable in a pipe section, has a dosing volume, wherein the dosing volume is in contact with the storage volume in a first position of the hollow piston, cleaning solution runs into the dosing volume in this first position, and the hollow piston moves in the direction of a second position in a gravity-driven manner, the cleaning solution located in the dosing volume exits through at least one first wall opening of the pipe section onto a cleaning object in the second position.

In further development of the method, it is provided that the hollow piston is moved from the second position into the first position, so as to be driven, in particular manually driven.

It is further provided that the dosing volume can be set by using a different hollow piston comprising a different dosing volume or by changing the dosing volume of a hollow piston.

The corresponding advantages have already been described in the case of the device. The work process made possible in this way has the result that the removal of the wetted and thus operational mop from the actuating means allows the latter to slide back into its rest position, which is associated with the simultaneous slide-back of the filled piston into the second position, whereby the collection tray is filled again. A dosed amount of cleaning liquid for the subsequent wetting process is thus available to a user. A user has to wait for the filling and movement of the hollow piston for the wetting of his mop cover only during the very first dosing process of a workday. During every subsequent wetting, the user inserts his fresh mop cover into the collection tray and thereby pushes the empty hollow piston upwards into its first position by means of the actuating means. While the cleaning liquid located in the collection tray is absorbed into the mop cover, the dosing volume fills. When removing the correctly wetted mop cover, the hollow piston slides into its second position, thus closes the storage volume, and dispenses the dosed amount of cleaning liquid into the collection tray as described.

Highly advantageously, a time delay in response to the wetting is thus avoided. A user has to only wait for the absorption of the liquid into his mop cover. Prior to the last wetting of an operation, the user removes the actuating device from the collection tray and preferably arranges it on the cleaning trolley or on the wall. A further hollow piston movement is thereby prevented, it remains in its second position, the reset position, with emptied dosing volume. The user then wets his mop with the dosed amount of cleaning liquid, which has already been located in the collection tray since the previous wetting process, after which said collection tray is largely emptied, and performs the cleaning process.

The invention will be described in an exemplary manner in a preferred embodiment with reference to a drawing, wherein further advantageous details can be gathered from the figures of the drawing.

Parts with identical function are thereby provided with identical reference numerals.

Figure 2:
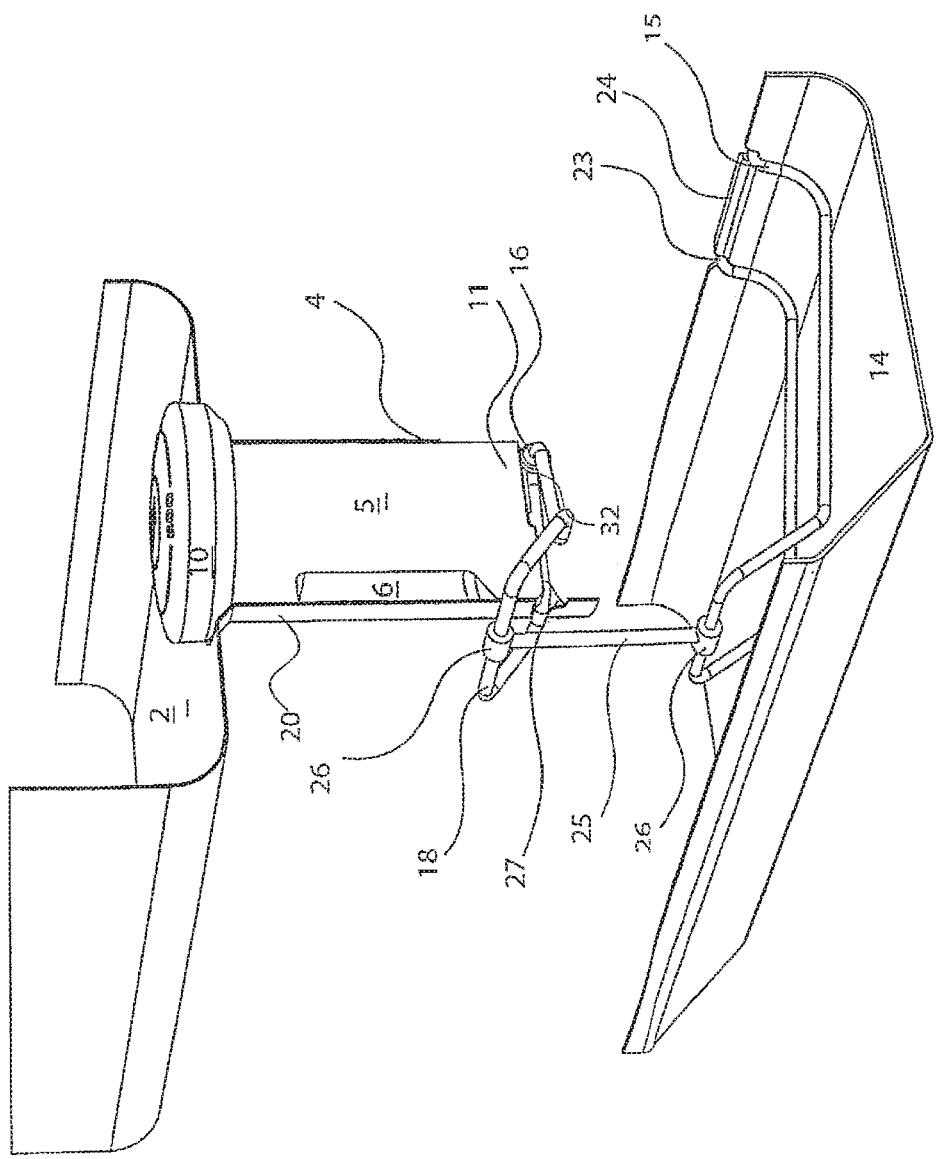
Figure 3C:
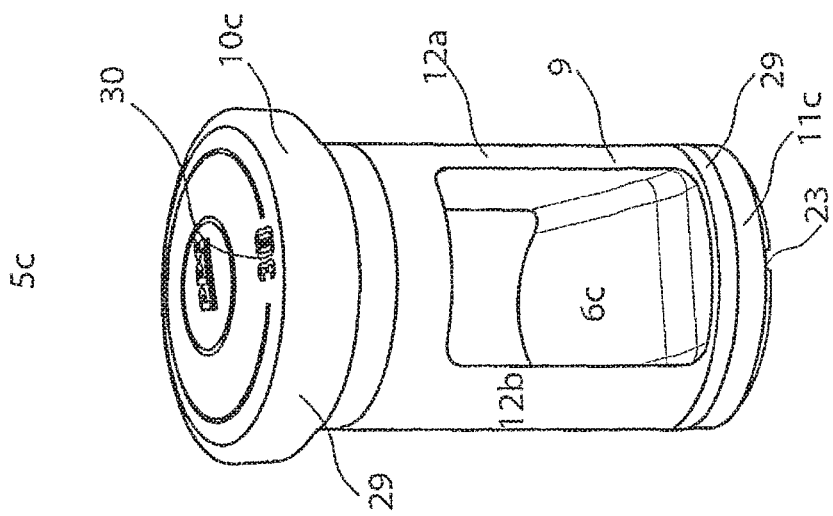
Figure 3B:
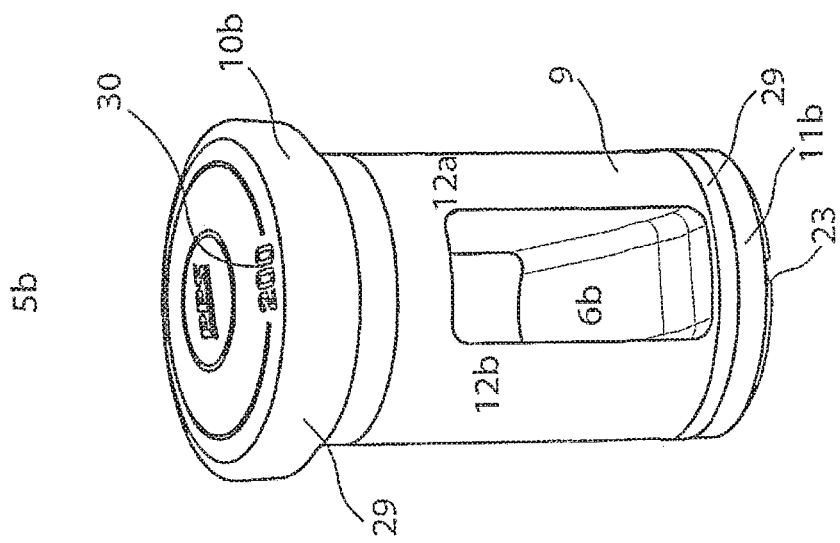
Figure 3A:
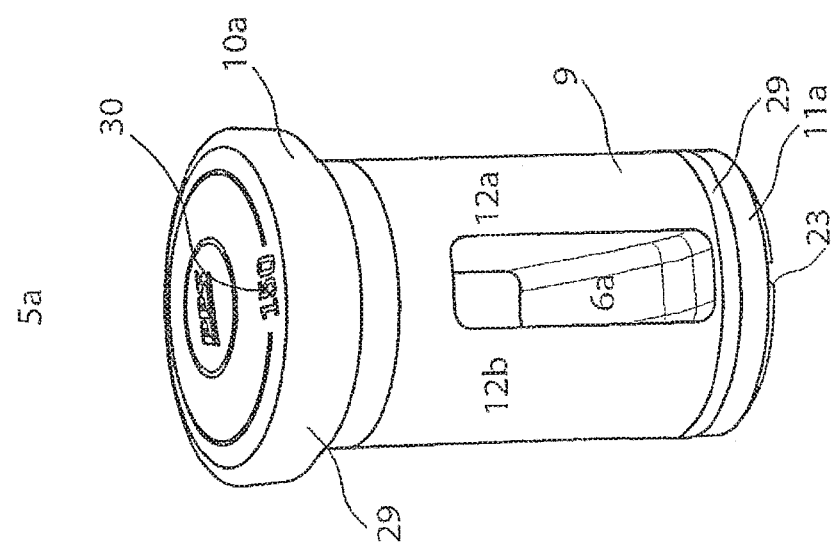
Figure 5A:
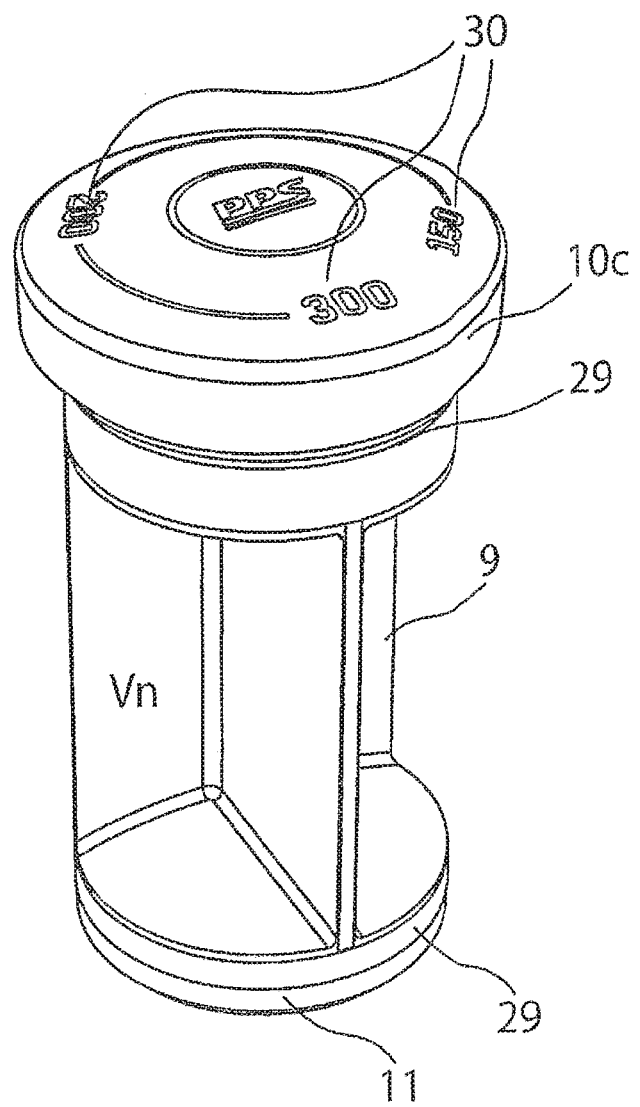
Figure 5B:
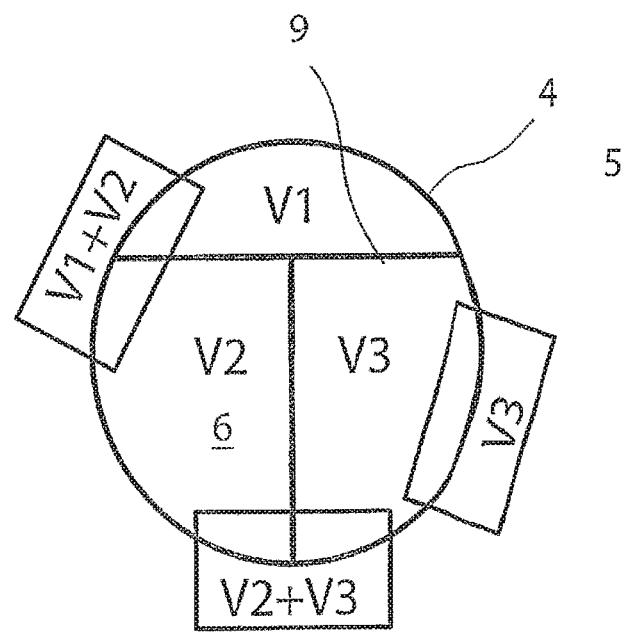
Figure 6:
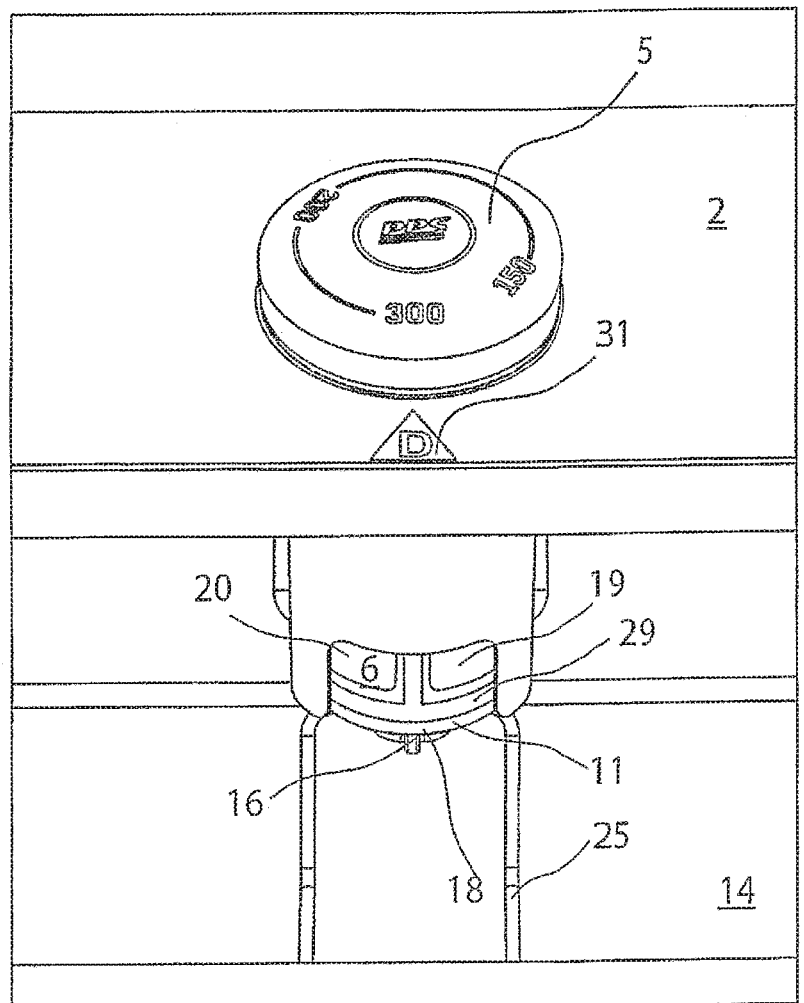
Figure 7:
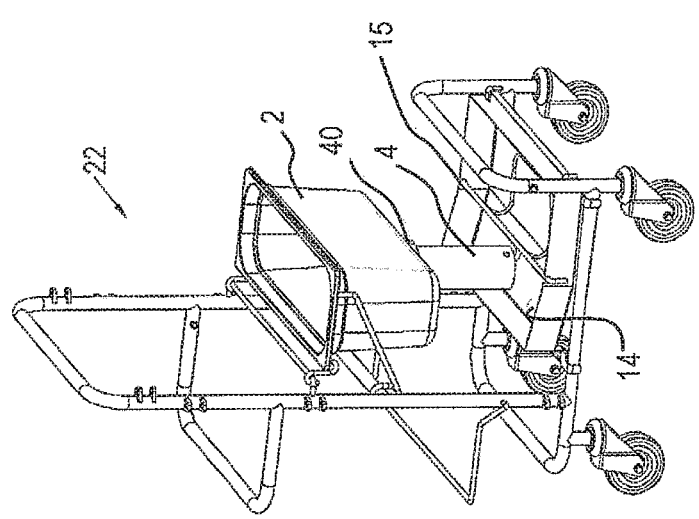
Figure 8:
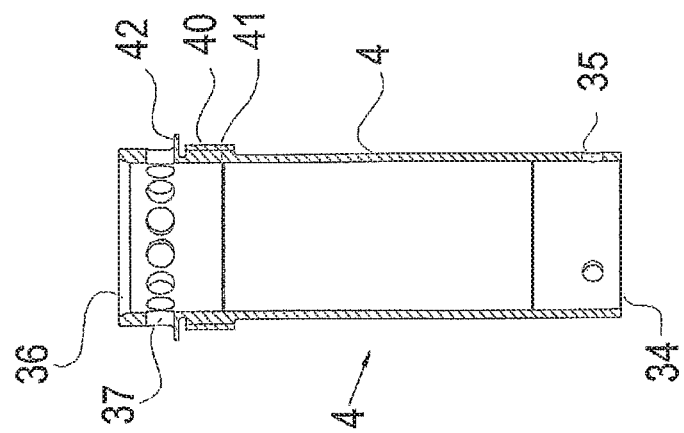
Figure 9A:
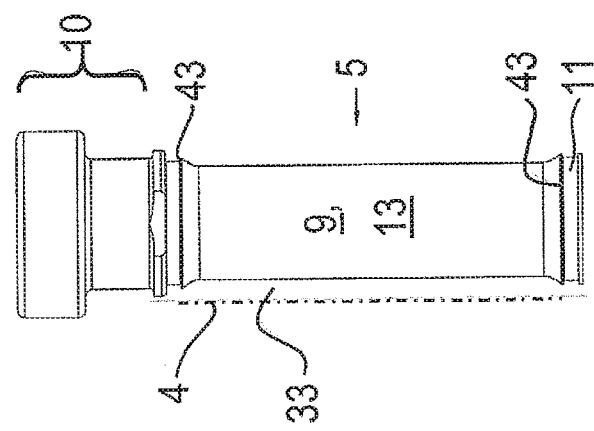
Figure 9:
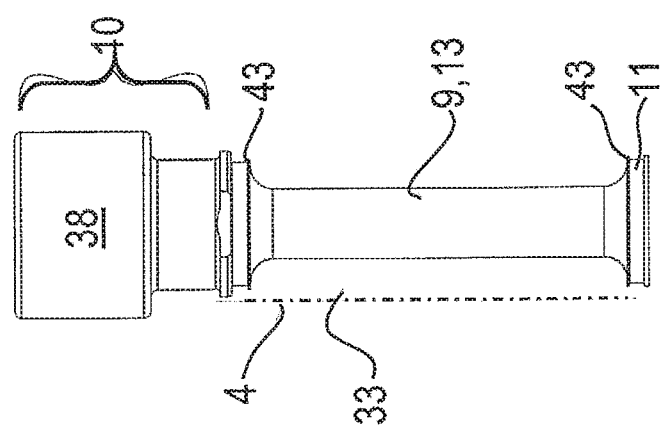

In detail, the figures of the drawing:

FIG. 1 shows a device according to the invention in first embodiment on a cleaning system trolley, FIG. 2 shows the actuation according to the invention of the device in first embodiment, FIGS. 3a, 3b and 3c show a first embodiment of the hollow piston according to the invention in three partial figures, FIGS. 4a, 4b and 4c show a second embodiment of the hollow piston according to the invention in three partial figures, FIGS. 5a and 5b show a third embodiment of the hollow piston according to the invention in two partial figures, FIG. 6 shows a detailed view of the storage volume according to the invention, FIG. 7 shows a preferred embodiment of the invention on a cleaning system trolley, FIG. 8 shows a preferred embodiment of the pipe section, and FIG. 9a and FIG. 9b show a fourth and preferred embodiment of the hollow piston according to the invention in two partial figures.

FIG. 1 shows the arrangement of the invention on a cleaning system trolley 22, which is illustrated in a simplified manner, in the case of which, for the sake of clarity, only one embodiment of the dosing system 1 according to the invention is illustrated. The arrangement on a larger cleaning system trolley 22, which would then have further containers, appliances and devices, would also be in accordance with the invention. Instead of an arrangement on such a cleaning system trolley 22, a wall assembly of the dosing device would also be in accordance with the invention, if the latter is required, for example, in a stationary manner, due to the local conditions or the desired cleaning sequences. In this case, the described cover would not be optional, the cleaning solution in the storage volume, which is covered and is largely closed off against the surrounding area in this way, would thus possibly be available for days. According to the invention, a pressure compensating option would also be arranged on the cover and/or storage volume in this case, possibly also comprising air filter, so as not to obstruct the removal of the cleaning liquid, when the storage volume empties slowly.

The dosing system 1 according to the invention has essentially two assembly groups, namely on the one hand, the storage volume 2, which is illustrated in a partially cut manner here, comprising pipe section 4 and a hollow piston 5, which is arranged so as to slide in said pipe section, and, on the other hand, a collecting tray 14, arranged at a distance below a lower end 17 of the pipe section 4, which is spaced apart from the storage volume 2. In the collection tray 14, an actuating element 15 can be seen, which is inserted in a recess 23 of the front wall 24 of the collection tray 14 and is thus articulated therein in a releasable manner. This actuating element 15 is a wire frame made of stainless steel, which is embodied so as to be connected to a tilt lever 18 via plastic connectors or wire brackets per frame 25. A user actuates the dosing system 1, in that his moves the mop plate of a mop holder, which is covered with a mop cover, between these two assembly groups and pushes on the actuating element 15. The latter then moves the hollow piston 5 into a first position, in which the hollow space 6 of the hollow piston is accessible for a cleaning solution located in the storage volume 2 in the use case. When the user no longer exerts pressure, the hollow piston 5 slides in a gravity-driven manner back into a second position, which represents its normal or initial position, respectively. In this position, the hollow space 6 thereof is embodied so as to be connected to a surrounding area of the device 1. FIG. 1 shows this very clearly. In other words, the first position in the case of this embodiment is that, in which the hollow piston 5 is raised, so that its front face cover 10, which is visible here, is located significantly above the bottom of the storage volume 2 and cleaning agent can flow into the hollow space. It goes without saying that the storage volume 2 can be provided with a cover, which closes it to the top, in particular so as to form a seal, so that no dirt and no objects can fall into it. An embodiment, in the case of which for example one or several channels lead from the storage volume 2 to the pipe section 4 and penetrate the wall thereof, so that they lead laterally to the hollow piston 5 and a lateral flow-in is made possible, is also in accordance with the invention. First and foremost, a position, which is sealed against the entrance of cleaning solution into the hollow space 6 and which can be accessed for this purpose, of the hollow piston 5 relative to the storage volume 2 is important for the invention.

FIG. 2 shows the collection tray 14 as section, comprising recess 23 in the front wall 24, into which the actuating element 15, here in the form of a wire bracket, is inserted and articulated. The wire brackets forms a pressure plate, which is embodied so as to be connected to a tilt lever 18, here in each case by means of plastic connectors 27, via a frame 25. The tilt lever 18 is mounted in a lead-through 27 of the pipe jacket 20 so as to be rotatable about an axis of rotation, and acts with an active end 16 on the hollow piston 5, in particular on the lower front face cover 11 thereof, more exactly on a contact element 21, which is embodied here as guide groove 32. The hollow piston 5 is illustrated in a cut manner in FIG. 2, wherein the sectional plane runs through the guide groove 32, and wherein the lower front face cover 11 is embodied integrally to the hollow piston 5. The sealing situation between bottom of the storage volume 2, which is illustrated in a cut manner, the upper front face cover 10, and the transition between pipe section 4 and this bottom can also be seen well. Seals, which may be present, are omitted.

The axis of rotation is formed by the two sections, which face one another, of the tilt lever 18, which is embodied as wire bracket, and which each permeate the pipe jacket 20. The illustrated position of the hollow piston 5 corresponds to its second position, which is to also be identified as lower dead point, or as rest position.

The alternative according to the invention is not illustrated, in the case of which the actuating element 15 is a mechanical actuating element, which is guided below the storage volume and which in particular protrudes laterally, for example like in shaft comprising cams and operating handle, like lever or wheel, or an actuating element, which is guided downward, like a pedal or foot switch. The exact embodiment of the actuating element is not mandatorily significant for the invention, as long as it is preferably one, which can be actuated mechanically, so as not to have to provide an electrical supply. Further aspects, which need to be considered, are a secure footing of a user, a least possible position change of the operator to the device during the operation thereof, and, if possible, also a hand contact-free operation, in order to be able to also meet demands of clean rooms. Even a motorized actuating element would be in accordance with the invention, if it takes into account the other aspects as completely as possible in spite of the disadvantages.

FIGS. 3a, 3b, and 3c show an embodiment of the hollow piston according to the invention in three partial figures. In the case of this embodiment, the dosing device 1 has three hollow pistons 5a, 5b and 5c, which are interchangeable, and which are each constructed identically, but have hollow spaces 6a to 6c, which are dimensioned differently to one another. A lower front face cover 11a-c is in each case connected to a two-piece spacer 9a-c by means of a substance-to-substance bond here, each part of which is embodied as cylinder jacket section 12a-c comprising wall thicknesses, which differ from one another. Viewed in the cross section, these cylinder jacket sections are in each case embodied as segment of a circle. A chute 28a-c provides for a controlled outflow of cleaning solution contained in the hollow space 6, wherein the size of the hollow spaces 6a-c is in each case defined by the different wall thicknesses of the cylinder jacket sections 12a-c. A seal 29, which is embodied so as to seal the hollow piston 5a-c against the non-illustrated inner wall of the pipe section 4, is in each case arranged in the area of the lower and of the upper front face cover 11, 10. The upper front face cover 10a-c is made of high-grade steel or a high-alloyed, rust-free and autoclavable steel, respectively, and, according to the invention, in each case shows a marking 30 for specifying volume.

FIGS. 4a, 4b and 4c show a second embodiment of the hollow piston 5 according to the invention in three partial figures, in three positions each. In the case of this embodiment, the dosing device 1 according to the invention only has one hollow piston 5, the size of the hollow space 6 of which is embodied so as to be capable of being set. This is attained according to the invention in that three spacers 9 are provided, which are embodied so as to be divided differently in their length and which, by means of a rotation of the two front face covers 10, 11 against one another, simultaneously change the distance thereof to one another. In the illustrated embodiment, a larger part of the axial length of the spacer 9 and thus of the distance between the two front face covers 10, 11, is realized by means of first spacer sections 9-1, which are integrally molded to the upper front face cover 10 and which are embodied of identical length to one another. Second spacer sections 9-2 are integrally molded to the lower front face cover 11 and have different lengths to one another, in particular more lower spacer sections 9-2 than upper spacer sections 9-1 are provided, wherein n spacers 9-1 and 2n or 3n lower spacers 9-2 are provided in each case. Two or three volumes can thereby be realized in an advantageous manner. According to the invention, a rotation lock of the two front face covers 10, 11 against one another is provided, which, in the preferred simplest case, is formed in that a lower spacer 9-2 of shorter axial length is embodied so as to be framed by two axially longer spacers 9-2. A stop can be integrally molded as rotation lock on the end side for the lower spacer 9-2 comprising the greatest axial length. The setting of the size of the hollow space 6 is thereby made possible in upper dead-center position of the hollow piston, thus in the first position 7 thereof, in the case of which the upper front face cover 10 can be seized by a user in the storage volume 2.

In the three rows V1, V2 and V3, FIGS. 4a, 4b and 4c show a sequence of hollow piston positions in the case of three different hollow space sizes. The first column in each case shows the second position, in the case of which the inner hollow space 6 is in contact with a surrounding area, while the upper front face cover 10 seals the cleaning agent volume located above. It can be seen well that the hollow piston 5 according to the invention consists of two independent parts here, which can be released from one another, which define the hollow space 6 between one another. The second column in each case shows an intermediate position, in the case of which an operator actuates the non-illustrated actuating element 15 and has thus moved the lower front face cover 11 by means of the active end 16, guided in the guide groove 32 (see FIG. 2) in the pipe in the direction of the upper front face cover 10. The lower front face cover 11 thus seals the pipe section 4 against the surrounding area. In the third, right-hand column, the first position is illustrated, in the case of which the hollow space 6 from the non-illustrated storage volume 2 is can be accessed for cleaning solution. This is suggested by means of an arrow. It can also be seen that volume V1 is smaller than the volume V2, which is smaller than the volume V3, in each case created by the setting of the axial total length of the three spacers 9, which are radially spaced apart identically and which in each case consist of an upper and a lower partial spacer 9-1, 9-2, which each have an axial partial length.

FIGS. 5a and 5b show a third embodiment of the hollow piston 5 according to the invention in two partial figures. In the case of this embodiment, the spacer 9 between the upper and the lower front face cover 10, 11 is embodied as web, which is branched in a star-shaped manner in the cross section, and which divides the hollow space 6 into identical or non-identical partial volumes $V_n$, two identical and one different partial volume are illustrated, the latter is not visible behind the rearward wall of the spacer 9. This web extends across the entire distance between the two front face covers 10, 11 and has closed walls. This hollow piston 5 thus has an unchangeable distance between upper and lower front face cover 10, 11. One sealing 29 can in each case be seen in the transition area of the upper or lower front face cover 10, 11, respectively, to the spacer 9.

All embodiments of the hollow piston 5 have in common that the respective hollow volume 6 is defined by the front face covers 10, 11, which are in each case embodied so as to form a seal, and an inner wall of the pipe section 4, in which the hollow pistons 5 are embodied so as move in a sliding manner. Even though a hollow piston 5 cannot be used on its own with this, material is saved and the covers can be embodied as simple turned parts comprising closed, smooth surfaces. In the case of this embodiment, the dosing volume can also be set by means of rotation, but this time of the entire hollow piston 5 relative to an outlet opening 19 of the pipe jacket 20 of the pipe section 4: If the hollow piston 5 is rotated by a user in such a way that the outlet opening 19 covers two partial volumes, the respective partial volumes thereof add up to a total cleaning agent volume, as illustrated in partial figure FIG. 5b).

Partial figure FIG. 5b) shows a schematic cross section through the star-shaped spacer 9. Three partial volumes V1 to V3 can be seen, which add to a total volume and which, together, form the hollow space 6. Five cleaning agent volumes, namely V1, V2, V3, V1+V2 and V2+V3, for example 50 ml, 150 ml, 200 ml, and 300 ml, can thus be realized with these three partial volumes, which is suggested by means of boxes. In the case of this embodiment, the upper front face cover 10 also has a marking 30 of the individual position, which releases the respective volume.

FIG. 6 shows this once again from a different perspective. The marking 31, which is arranged on the bottom of the storage volume 2, can be seen, to which the marking 30 is to be arranged so as to be aligned, in order to dispense the desired volume of cleaning solution. The hollow piston 5 is illustrated in its second position, in the case of which the hollow space 6 is in communication with the surrounding area. The lower sealing ring 29 as well as the outlet opening 19 in the pipe jacket 20, the active end 16 of the tilt lever 18, and a part of the frame 25 can be seen. Collection tray 14 and storage volume 2 are suggested in a cut manner.

FIG. 7 shows a preferred embodiment of the invention on a cleaning system trolley 22. In the case of this embodiment, the collection tray 14 comprising actuating element 15 arranged thereon is also arranged spaced apart from a storage volume 2. In the case of this embodiment, the actuating element 15 also has an active end 16, which acts on the hollow piston 5. The pipe section 4, which is cylindrical here, ends in the area of the collection tray, thus below the edge thereof. This prevents a splashing of cleaning solution and thus provides for clean work. The actuating element 15 is inserted into recesses of the edge of the collection tray 14 and can thus be removed easily for cleaning. The collection tray 14 is embodied with a bent bottom surface, the inclined part of which is arranged in the area of the end 34 of the cylindrical pipe section 4 facing away from the storage volume, so that the cleaning liquid escaping there flows in the direction of a mop cover, which actuates the device. This ensures clean work as well as a consistent wetting capacity, because the cleaning solution always flows to the mop cover. Details with regard to the preferred embodiment of the pipe section are illustrated in more detail in FIG. 8, but it can already be seen in FIG. 7 that it can be releasably fastened to a storage container bottom from below, in particular fastened so as to clamp this bottom, by means of a nut 40. This nut 40 can also be a cap nut. A fastening by means of quick coupling, bayonet closure and the like would also be in accordance with the invention.

FIG. 8 shows a preferred embodiment of the pipe section 4 in the longitudinal section. The lower end 34, which faces away from the storage volume, has three first wall openings 35, which are embodied as through bores and have an angular distance of 120° to one another. The cross sectional surface sum thereof, which is rather low as compared to the dosing volume, advantageously ensures a rather slow emptying of the dosing volume, so that clean work is made possible. These first wall openings 35 are located so close to the end 34, which faces away from the storage volume that they are flush with the upper edge of a lower front face cover 11 (see FIGS. 9a) and 9b)), whereby a dead volume is advantageously avoided. In other words, no cleaning solution exits through the lower axial opening of the cylindrical pipe section 4, the latter is embodied so as to be sealed by the hollow piston 5. The number, the angular distance, and the size of these first wall openings can thereby be selected variably according to the invention, as long as a sufficiently slow outflow is ensured.

The upper end 36 on the storage volume side has an external thread 41, onto which the cap nut 40 can be screwed. A circumferential support web 42 and a plurality of second wall openings 37 are arranged above the external thread 41. This embodiment of the pipe section 4 can be inserted into a storage volume 2 from the top and rests with the support web 42 on the bottom thereof, in particular so as to form a seal, in the inserted state. To releasably fasten the pipe section 4, the nut 40 can be slid on from the opposite, lower end and can be screwed-connected in the direction of the support web 42. As already mentioned, a bayonet closure, a quick coupling or any other connecting device, which can be released and cleaned easily, instead of a nut is also in accordance with the invention.

In the use state, the end 36 on the storage volume side protrudes with its edge and its two wall openings 37 into the storage volume. An upper front face cover 10 bears on the edge, but a cleaning solution cannot yet reach into the hollow piston 5 in this position (see FIGS. 9a) and 9b)). A quick inflow of the cleaning solution is ensured according to the invention by means of the plurality of second wall openings 37 and the upper axial opening of the pipe section 4, because cleaning solution can flow through all of these openings in the first position of the hollow piston into the dosing volume thereof.

FIGS. 9a) and 9b) show a fourth and preferred embodiment of the hollow piston according to the invention in two partial figures, each in side view. Upper front face cover 10, lower front face cover 11, spacer 9, here as web 13, namely as column-like web 13, which is round in the cross sectional surface, can be seen here. FIG. 9a) shows a hollow piston 5 comprising small dosing volume 33, formed between the column-like spacer 9 and a wall surface of the cylindrical pipe section 4, here suggested in a dashed manner. An upper and a lower sealing ring 43, which seal the dosing volume 33 against the wall surface, can further be seen. The upper front face cover 10 is thereby divided into two axial areas comprising different radii, the radially greater one of which rests on the edge of the pipe section, and the radially smaller one of which is arranged in the interior of the pipe section, for instance in the area of the second wall openings 37. The upper front face cover 10 is thus embodied with a significantly greater axial length than the lower front face cover 11, because, in addition to the sealing function, it also fulfills a weight compensation function and a quick inflow function. FIG. 9b) shows this.

FIG. 9b) shows a hollow piston 5 according to the invention comprising greater dosing volume 33, effected by a column-like spacer 9 comprising smaller diameter. In particular the embodiment of the upper front face cover 10 with a compensation weight 38 can be seen here. In the case of this embodiment, the density of the piston material is significantly greater than that of the cleaning solution, so that the lower volume of the column-like spacer 9 is compensated by the compensation weight 38 according to the invention, so that the total weight of a filled hollow piston 5 across all different hollow pistons is identical. The sinking behavior thereof in the pipe section 4 is thereby also identical, a user of the device according to the invention thus always experiences the same behavior of the system, regardless of the size of the dosing volume. In the empty state, the hollow piston thereby also sinks into the second position, in a gravity-driven manner—or, in other words, also every hollow piston of a different weight—but a similarity of the pistons is advantageous for a user.

As cylindrical body, such a hollow piston 5 can be produced as injection molded part or as turned and/or milled part in a simple manner.

The invention thus specifies a dosing system comprising changeable dosing volume, in that either a single hollow piston can be changed in its dosing volume by means of a settable distance of its front face covers to one another by changing the length of the spacer or spacers, or—preferably—by providing a plurality of hollow pistons, which preferably do not differ in their relevant external dimensions, but in their respective spacer volume and thus in the respective dosing volume, and which, however, thereby have an identical total mass of hollow piston and dosing amount to the greatest possible extent. In an advantageous manner, this embodiment allows for the use of the same device for wetting a large variety of mop covers or, more generally, surfaces, which are to be contacted with cleaning solution, which require different amounts of cleaning solution. As a result of the change according to the invention of the dosing volumes of the hollow piston, structurally complex dosing volume setting mechanism, which are difficult to clean, are avoided in an advantageous manner, in particular also those comprising rotating parts, drives, displays, time-dependent opening times, etc. The simplest structural solutions are often the preferred ones, especially in the field of commercial cleaning.

In a highly advantageous manner, the hollow spaces of the hollow bodies, which are to be cleaned, can be accessed easily, the device avoids all active drives in the form of motors, springs or similar return elements and eliminates the operating time dependency of the dosing by using the force of gravity in an advantageous manner: A user can push the actuating element as he pleases for as long as he wants, without resulting in a cleaning agent overdosage. In a highly advantageous manner, the entire device can be autoclaved and thus meets the highest demands on hygiene. In a highly advantageous manner, the dosing volume according to the invention is automatically self-filling by means of a purely linear movement of the hollow piston according to the invention into a first position, and self-emptying in its second position.

LIST OF REFERENCE NUMERALS

1 dosing system
2 storage volume
3 dosing device
4 pipe section
5 hollow piston
6 hollow space
7 first position
8 second position
9 spacer
10 front face cover
11 front face cover
12 cylinder jacket section
13 web
14 collection tray
15 actuating element
16 active end
17 farthest end
18 tilt lever
19 outlet opening
20 pipe jacket
21 contact element
22 cleaning system trolley
23 recess
24 front wall
25 frame
26 connector
27 lead-through
28 chute
29 seal
30 marking
31 marking
32 guide groove
33 dosing volume
34 end facing away from the storage volume
35 first wall opening
36 end on the storage volume side
37 second wall opening
38 compensation weight
39 edge on the storage volume side
40 nut
41 external thread
42 support web
43 sealing ring

The invention claimed is:

1. A dosing system (1) for cleaning liquids in the field of commercial cleaning having a storage volume (2) and a dosing device (3) arranged on the storage volume (2), wherein the dosing device (3) has a pipe section (4), which communicates with the storage volume (2), and a hollow piston (5), which is movably guided in said pipe section, wherein a hollow space (6) of the hollow piston (5), which is in the first position (7), can be accessed from the storage volume (2), and the hollow space (6) of the hollow piston (5), which is in a second position (8), communicates with a surrounding area of the dosing system (1), wherein the hollow piston (5) has two front face covers (10, 11), which are spaced apart from one another by means of a spacer (9) and which define a dosing volume (33) between one another, characterized in that the spacer (9) is embodied as cylinder jacket section (12) and/or as a column-like web (13), wherein the web (13) is embodied so as to be connected to a front face cover (10, 11), wherein the hollow piston (5) is interchangeable, wherein a front face cover (10, 11) has a compensation weight (38), in particular a compensation weight (38), which is arranged in such a way that, in the second position (8), it rests on a storage volume-side edge (39) of the pipe section (4).

2. The dosing system (1) according to claim 1, characterized in that the pipe section (4) is embodied cylindrically and has at least one first wall opening (35) on its end (34), which faces away from the storage volume, and/or has at least one second wall opening (37) on its end (36) on the storage volume side.

3. The dosing system (1) according to claim 1, characterized in that it has more than one hollow piston (5), in particular several hollow pistons (5), which each differ in their dosing volume (33), preferably due to different spacer volumes.

4. The dosing system (1) according to claim 1, characterized in that the spacer (9) is embodied in a column-like manner.

5. The dosing system (1) according to claim 1, characterized in that it has a collection tray (14), which is spaced apart from the storage volume (2).

6. The dosing system (1) according to claim 5, characterized in that an actuating element (15), which acts on the hollow piston (5), is provided, in particular a mechanically acting actuating element (15), preferably one, which acts purely mechanically, wherein the actuating element (15) is arranged in the collection tray (14), and has an active end (16) acting on the hollow piston (5), wherein the collection tray (14) is preferably embodied so as to be spaced apart from an end (17) of the pipe section (4), which is at a distance from the storage volume (2), and wherein the actuating element (15) is preferably embodied so as to be articulated on the collection tray (14), in particular a tilt lever (18) is arranged between actuating element (15) and active end (16).

7. The dosing system (1) according to claim 6, characterized in that the remote end (17) has an outlet opening (19) in the pipe section (4).

8. The dosing system (1) according to claim 1, characterized in that it is embodied for wall assembly, and/or has a cover and/or a pressure compensation device.

\* \* \* \* \*